(12) United States Patent
Von Arx (10) Patent No.: US 10,334,078 B2
(45) Date of Patent: Jun. 25, 2019

(54) TUNABLE CLIENT-SERVER COMMUNICATIONS FILTERING

(71) Applicant: Bank of America Corporation, Charlotte, NC (US)

(72) Inventor: Claude D. Von Arx, Singapore (SG)

(73) Assignee: Bank of America Corporation, Charlotte, NC (US)

( * ) Notice: Subject to any disclaimer, the term of this patent is extended or adjusted under 35 U.S.C. 154(b) by 474 days.

(21) Appl. No.: 15/152,704

(22) Filed: May 12, 2016

(65) Prior Publication Data

US 2017/0142197 A1   May 18, 2017

Related U.S. Application Data

(60) Provisional application No. 62/255,604, filed on Nov. 16, 2015.

(51) Int. Cl.
*H04W 4/18* (2009.01)
*H04L 29/06* (2006.01)

(52) U.S. Cl.
CPC .............. *H04L 67/42* (2013.01); *H04W 4/18* (2013.01)

(58) Field of Classification Search
CPC ...... G06Q 40/025; G06Q 40/02; G06Q 40/00; G06Q 30/0601; G06Q 30/06; G06Q 40/06; G06Q 20/3223; G06Q 20/36; G06Q 20/1085; G06Q 30/0206; G06Q 40/10
See application file for complete search history.

(56) References Cited

U.S. PATENT DOCUMENTS

| | | | |
|---|---|---|---|
| 6,035,287 A | 3/2000 | Stallaert et al. | |
| 7,124,106 B1 | 10/2006 | Stallaert et al. | |
| 7,389,265 B2* | 6/2008 | Lawrence | G06Q 20/04 705/38 |
| 7,464,057 B2* | 12/2008 | Cole | G06Q 20/02 705/37 |
| 7,620,597 B2* | 11/2009 | Eze | G06Q 40/025 705/38 |
| 7,765,133 B1 | 7/2010 | Edelstein et al. | |
| 7,941,370 B2* | 5/2011 | Paulsen | G06Q 20/02 705/1.1 |

(Continued)

*Primary Examiner* — Sargon N Nano
(74) *Attorney, Agent, or Firm* — Weiss & Arons LLP; Michael A. Springs, Esq.

(57) ABSTRACT

An apparatus for detection, remediation and inference rule development for multi-layer information technology IT structures is provided. Certain embodiments of the apparatus may include an event generator. The event generator may monitor for, retrieve, and pool error events and performance events from alerting sources. The alerting sources may provide event information from one more of multiple layers. The apparatus may also include an event parser that provides a system status. The apparatus may include an analytics engine that detects patterns and relationships in the retrieved error events, performance events and system status, and models event hierarchies based on the detected patterns and relationships. The analytics engine may invoke auto-remediation processes in response to pre-determined error events. In some embodiments, the engine may detect a pre-determined number of resource-related events. Based on the detecting, the analytics engine may attribute the resource-related events to infrastructure resources.

17 Claims, 3 Drawing Sheets

(56) References Cited

U.S. PATENT DOCUMENTS

| | | |
|---|---|---|
| 8,706,614 B2* | 4/2014 | Lawrence .............. G06Q 20/04 |
| | | 705/38 |
| 8,732,061 B2 | 5/2014 | Gilbert |
| 8,738,524 B2 | 5/2014 | McFarland et al. |
| 8,781,946 B2 | 7/2014 | Mintz et al. |
| 8,788,396 B2 | 7/2014 | Cole et al. |
| 8,924,278 B2 | 12/2014 | Farrell et al. |
| 9,082,152 B2 | 7/2015 | Mura |
| 2007/0192242 A1* | 8/2007 | Kunz .................... G06Q 40/02 |
| | | 705/38 |
| 2008/0033775 A1* | 2/2008 | Dawson ............. G06Q 10/0635 |
| | | 705/7.28 |
| 2011/0313884 A1* | 12/2011 | Eze .................... G06Q 30/0601 |
| | | 705/26.41 |
| 2014/0032394 A1* | 1/2014 | Liberty ................ G06Q 40/025 |
| | | 705/38 |
| 2014/0236796 A1 | 8/2014 | Colon Bolea et al. |
| 2014/0279696 A1 | 9/2014 | Korn et al. |
| 2015/0058196 A1 | 2/2015 | Martorano et al. |
| 2015/0095258 A1 | 4/2015 | Odabashayan et al. |
| 2015/0178828 A1 | 6/2015 | Parekh |
| 2015/0186995 A1 | 7/2015 | Renalds et al. |
| 2015/0278971 A1* | 10/2015 | Moon .................... G06Q 50/16 |
| | | 705/313 |
| 2015/0363862 A1* | 12/2015 | Ranft ................. G06Q 30/0631 |
| | | 705/26.7 |
| 2016/0232546 A1* | 8/2016 | Ranft ................. G06Q 30/0206 |
| 2016/0343052 A1* | 11/2016 | Hudson .............. G06Q 30/0611 |
| 2017/0161826 A1* | 6/2017 | Packer ................ G06Q 40/025 |

* cited by examiner

TUNABLE CLIENT-SERVER COMMUNICATIONS FILTERING

CROSS-REFERENCE TO RELATED APPLICATION

This application is a non-provisional of U.S. Provisional Patent Application No. 62/255,604, filed on Nov. 16, 2015, entitled, "TUNABLE CLIENT-SERVER COMMUNICATIONS FILTERING."

FIELD OF TECHNOLOGY

Aspects of the invention relate to tunable filtering of client-server communications.

BACKGROUND

For the purposes of this application, a client may be understood to be an entity that is being serviced at least in part by electronic communication.

For the purposes of this application, a server may refer to an electronic computer resident at an entity that serves the one or more clients.

Certain servers are committed to a process-driven model for serving one or more clients—i.e., the internal, entity-related, process, takes priority over providing service in response to client instructions. Once the internal, entity-related, process is completed, the servers may then, and, at times, only then, respond to clients.

Such servers preferably perform client instructions internally, complete performance of such instructions, and then, following completion of client instructions, revert back to the client with confirmation of completion of client instructions.

In addition, such servers may preferably also execute a step of matching completed instruction data with the client. Following the matching step, the server may then correct, perform internally discrepancy checking, and communicate discrepancies between the client's instructions and completed instructions to the client in order to further process the client instructions.

However, it may be more efficient, under certain circumstances, to communicate confirmation of performance of client instructions, prior to actual performance and execution of such instructions.

It may be also be desirable to provide a validation filter which determines which client instructions may be confirmed as performed and completed prior to performance and completion of said instructions.

It may yet further be desirable to, except under certain exceptional circumstances, drop discrepancy checking.

It may be still further desirable to provide a validation filter which determines which client instructions should not be performed and completed.

SUMMARY OF THE DISCLOSURE

Certain algorithms according to embodiments of the invention may include a method for determining whether a client instruction satisfies predetermined tolerances. The method may include receiving, using a server, a client instruction.

The instruction may include a client identification, a client type and a total instruction value.

The method may also include filtering, using a plurality of filters resident in the server, the client instruction to accept only a client instruction that is associated with an acceptable client, an acceptable client type, and the total value associated with the instruction is within a predetermined tolerance of an acceptable total value. The predetermined tolerance may be based on the client and the client type.

Upon determination that the client is an acceptable client, the client type is an acceptable client type, and the total value is within a predetermined tolerance of an acceptable total value, the method may further include, preferably prior to completion of performance of the instruction, confirming completion of performance of the instruction. Following the server confirming completion of performance of the instruction, the method may also include transmitting a message from the server to a client instruction processing platform to complete performance of the instruction.

BRIEF DESCRIPTION OF THE DRAWINGS

The objects and advantages of the current invention will be apparent upon consideration of the following detailed description, taken in conjunction with the accompanying drawings, in which like reference characters refer to like parts throughout, and in which.

DETAILED DESCRIPTION OF THE DISCLOSURE

Following receipt of a client instruction, it is highly desirable to perform the client instruction as soon as possible and confirm performance of the instruction back to the client. In some circumstances, a transmission may be sent to the client confirming performance of the instruction at some predetermined time in the future—e.g., one hour after market close.

In certain embodiments, the client instruction may include a block instruction. A block instruction may include a single instruction that includes multiple, smaller instructions. The client instruction may also include allocation information that allocates a portion of the performance of the block instructions to various entities or sub-entities. Accordingly, the confirmation transmission to the client may include, for example, a confirmation of block instruction information. The confirmation of the block instruction information may relate to confirmation of the instruction that includes confirmation of multiple, smaller instructions. Furthermore, the confirmation transmission may include a confirmation of allocation information. In certain embodiments, the server may be configured to preferably immediately confirm completion of performance of the client instruction, prior to the actual performance of the client instruction, according to the block and allocation information.

It should be noted that in certain embodiments, the execution by a server of the client instructions with respect to block and allocation information may preferably mimic information in the client instruction and, in such embodiments, may be independent of any server related changes, adjustments, instructions or other similar information. In such embodiments, the client instruction may be filtered to ensure that the client instruction meets certain, preferably rudimentary, validation criteria prior to the server transmitting a confirmation message to the client originator of the instruction. The execution by the server is also preferably independent of any matching with a second client's instruction, or with other internal server information, because the server accepts, pending validation, the information in the client instructions. Such acceptance eliminates merging and splitting of client instructions because the server, following validation, accepts the client instruction (including block and allocation information), accepts such information as a client transaction rate (if the instruction involves value information) and instruction date. In addition, such embodiments preferably only reject client instructions if there are material differences between a client instruction and server or entity performed instruction and/or standards, and the differences are substantial enough to cause even the coarse filter to reject the instruction. Furthermore, such embodiments preferably reduce monitoring for material differences, as stated above, because such differences rarely cause a difference in execution of a client instruction.

Using a coarse filter i.e., a filter that accepts client instructions even if there are differences between the client instruction and predetermined order information or standards—instead of one or more high-granularity or more selective filters, enables immediately transmitting performance confirmation to the originator of the client instruction. Furthermore, such reduction in the granularity and/or discretion of the incoming filter preferably reduces information processing overhead.

Further, such reduction in the granularity of the incoming filter and reduction in information processing overhead may provide certain benefits to the server, or an entity associated with the server. For example, such reduction in the granularity of the incoming filter and reduction in information processing overhead may allow the server to exhibit better end-to-end performance in client instruction processing. In addition, such reduction in the granularity of the incoming filter and reduction in information processing overhead may incentivize certain clients to move to fully electronic client-server transactions as opposed to more resource consumptive human-conducted transactions thereby reducing server-side manual intervention. Such reduction in manual intervention may reduce manual handling of server-side processing of client instructions as well as server-side processing of blocks and allocations.

Yet another advantage associated with such reduction in the granularity of the incoming filter and reduction in information processing overhead is that the execution of client instructions preferably occurs independent of matching the incoming client instructions with any information internal to the server. Being independent of matching further conserves server resources and increases execution speed. In addition, because the confirmation transmission occurs prior to actual client instruction execution, such embodiments may preferably eliminate instruction date processing, because the actual processing can occur at a time different from the one confirmed to the client, as long as the processing occurs priors to the instruction settlement date.

In addition, such embodiments may apply to processing of any type of client instructions, not just a certain class of client instructions. Further, such embodiments preferably reduce post-instruction confirmation transmission issues because the embodiments reduce such issues to preferably exclusively internal issues. Therefore, no additional, substantive communications need occur with the client. Instead, the server side can preferably attend only to the instruction processing and execution issues as opposed to attending to resource-consuming issues such as discrepancy resolution, block allocation, etc.

Certain embodiments may include an apparatus for tunable client-server communications filtering. The apparatus may include a server that receives a client instruction.

The instruction may include a client identification, a client type and a total instruction value. The instruction value may correspond to a financial value associated with the instruction, a goodwill value associated with the instruction, a client importance value associated with the instruction, some combination of the various values and/or any other suitable values associated with the instruction.

Upon the server receiving the client instruction, the server may filter the client instruction to determine whether, in view of the characteristics of the instruction, the client instruction is associated with an acceptable client. The server may filter the instruction to determine whether the client type, in view of the characteristics of the instruction, is associated with an acceptable client type. The server may filter the instruction to determine whether the total instruction value associated with the instruction is an acceptable value.

The server may also filter the client instruction to determine whether the client, the client type and/or the total instruction value is within a predetermined tolerance of acceptability. Such a determination(s) may be based at least in part on the characteristics of the instruction.

Then, upon determination that the client instruction is associated with an acceptable client, the client type is an acceptable client type, in view of characteristics of the instruction, and the total instruction value is an acceptable instruction value (or the client, client type and/or total instruction value are within a tolerance of an acceptable instruction value) prior to completion of performance of the instruction, the server may immediately confirm completion of performance of the instruction to the client.

Following a transmission of confirmation of completion of performance to the client, and, prior to actual confirmation of completion of performance, the server may contact a client instruction processing platform. The server may transmit a message to the client instruction processing platform to complete performance of the instruction.

It should be noted that at least one of the plurality of filters used by the server may be tunable. For example, the filter may be tunable such that the at least one filter may be tuned to select for immediate transmission to the client a greater magnitude or a smaller magnitude of client instructions. The tunability may be based at least in part on adjusting the predetermined tolerance.

The plurality of filters may include at least two of a price variance filter, a commission filter, a direction filter, a value date filter, an interest code filter, a block instruction code filter and an anti-money laundering code filter.

The server may include an exception engine. In certain embodiments, the exception engine may be used to determine whether at least one of the plurality of filters may be overridden.

The server may also include, or be in electronic communication with, an operations exception engine. The operation exception engine may be used, in place of one of the server-hosted filters, to determine whether the client is an acceptable client. The operations exception engine may also be configured to determine whether a client type associated with the client instruction is an acceptable client type.

The server may include, or be in electronic communication with, an execution engine. The execution engine may be operationally coupled to the plurality of server filters. The execution may provide filter data to the plurality of server filters.

In certain embodiments, the client instruction may also include block and allocation information. Such block information may relate to an instruction that includes multiple, smaller instructions. Such allocation information may refer to the incremental distribution of a block execution of an instruction to entities (or sub-entities) associated with the various smaller instructions. In certain embodiments, the server may be configured to preferably immediately confirm completion of performance of the instruction according to the block and allocation information.

In some embodiments, the server may be configured to confirm completion of client instructions at times other than immediately. By throttling down the confirmation transmission, such non-immediate confirmation may tend to preserve confidence of the system and processes being used internally. For example, in certain embodiments, the server may be configured to confirm completion at a predetermined time of day. In certain embodiments, the server may be configured to confirm completion within a predetermined amount of time from receipt of the instruction. In certain embodiments, the server may be configured to confirm completion following a random amount of time after receipt of the instruction. In some embodiments, the random amount of time following receipt of the instruction may be limited to be greater than a first magnitude of time, and less than a second magnitude of time but still be random within the predetermined window.

In some embodiments, the tolerance may be system-set to perform dynamically. For example, the tolerance may continually vary. The tolerance may periodically vary. Such a variance of the tolerance may also preserve confidence of the system and processes being used internally because a client may not be able to track the reasons for immediate acceptance of an instruction or non-acceptance of an instruction.

It should be noted that clients may be classified in one or more categories. For example, certain clients may be classified, based on client characteristics, as class A clients. Certain clients may be classified as class B clients. In addition, clients may also be associated with a client type.

With respect to a first client category and/or a first client type, one set of client instruction values may be acceptable. With respect to a second client category and/or a second client type, a second set of client instruction values may be acceptable. Accordingly, an algorithm for determining whether to immediately confirm performance of a client instruction may be based on client identification, client type and/or client instruction value.

In certain embodiments, the server may include, or be in electronic communication with, a configurable rules engine. The configurable rules engine may preferably include rules for setting client tolerance, client type tolerance and value tolerance.

Certain embodiments may include a method for determining whether a client instruction satisfies predetermined tolerances. Such embodiments may receive, using a server, a client instruction. The instruction may include a client identification, a client type and a total value.

The method may further include filtering, using the server, the client instruction to accept only a client instruction that is associated with an acceptable client, an acceptable client type, in view of the characteristics of the instruction, and a total value within a predetermined tolerance of an acceptable total value. The acceptable total value may, in certain embodiments, be based on the client and the client type.

Upon determination that the client is an acceptable client, and the client type is an acceptable client type, and the total value is within a predetermined tolerance of an acceptable total value the method may include confirming completion of performance of the instruction. The confirming may occur prior to the actual completion of the performance of the instruction.

Following the server confirming, preferably immediately, completion of performance of the instruction, the method may further include transmitting a message from the server to a client instruction processing platform to complete performance of the instruction.

Certain embodiments may include filtering the instruction using at least two or more of a price variance filter, a commission filter, a direction filter, a value date filter, an interest code filter, a block instruction code filter and an anti-money laundering code filter.

Illustrative embodiments of apparatus and methods in accordance with the principles of the invention will now be described with reference to the accompanying drawings, which form a part hereof. It is to be understood that other embodiments may be utilized and that structural, functional and procedural modifications may be made without departing from the scope and spirit of the present invention.

As will be appreciated by one of skill in the art, the invention described herein may be embodied in whole or in part as a method, a data processing system, or a computer program product. Accordingly, the invention described herein may take the form of an entirely hardware embodiment, an entirely software embodiment or an embodiment combining software, hardware and any other suitable approach or apparatus.

Furthermore, aspects of the invention may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

A computer according to certain embodiments may have a processor for controlling the operation of devices its associated components. The computer may include RAM, ROM, an input/output module, and/or a memory. The processor will also execute all software running on the computer—e.g., the operating system. Other components commonly used for computers such as EEPROM or Flash memory or any other suitable components may also be part of the computer.

The memory may be comprised of any suitable permanent storage technology e.g., a hard drive. The memory stores software including the operating system, any application(s) along with any data needed for the operation of the system. Alternatively, some or all of computer executable instructions may be embodied in hardware or firmware (not shown). The computer executes the instructions embodied by the software to perform various functions.

Input/output ("I/O") module may include connectivity to a microphone, keyboard, touch screen, and/or stylus through which a user of computer may provide input, and may also include one or more speakers for providing audio output and a video display device for providing textual, audiovisual and/or graphical output.

System may be connected to other systems via a LAN interface.

System may operate in a networked environment supporting connections to one or more remote computers. Terminals may be personal computers or servers that include many or all of the elements described above relative to the system. The network connections may include a local area network (LAN) and a wide area network (WAN), but may also include other networks.

When used in a LAN networking environment, the computer is connected to a LAN through a LAN interface or adapter. When used in a WAN networking environment, the computer may include a modem or other means for establishing communications over WAN, such as the Internet.

It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various web browsers can be used to display and manipulate data on web pages.

Additionally, application program(s), which may be used by computer, may include computer executable instructions for invoking user functionality related to communication, such as email, Short Message Service (SMS), and voice input and speech recognition applications.

The computer and/or terminals may also be devices including various other components, such as a battery, speaker, and antennas (not shown).

The terminals may be portable devices such as a laptop, cell phone, Blackberry™, or any other suitable device for storing, transmitting and/or transporting relevant information. The terminals may be other devices. These devices may be identical to the system or different therefrom. The differences may be related to hardware components and/or software components.

A computing machine according to the invention may include one or more chip modules, which may include one or more integrated circuits, and which may include logic configured to perform any other suitable logical operations.

Such a computing machine may include one or more of the following components: I/O circuitry, which may include a transmitter device and a receiver device and may interface with fiber optic cable, coaxial cable, telephone lines, wireless devices, PHY layer hardware, a keypad/display control device or any other suitable encoded media or devices; peripheral devices, which may include counter timers, real-time timers, power-on reset generators or any other suitable peripheral devices; logical processing devices, which may validate and/or filter incoming client information and instructions, communicate with client regarding same, query internal sub-entities regarding validation and execute and/or perform the instructions, and machine-readable memory.

The machine-readable memory may be configured to store in machine-readable data structures: information pertaining to a user, information pertaining to an account holder and the accounts which he may hold, the current time, information pertaining to historical client activity and/or any other suitable information or data structures.

Components of the computing machine may be coupled together by a system bus or other interconnections and may be present on one or more circuit boards. In some embodiments, the components may be integrated into a single chip. The chip may be silicon-based.

Figure 1:
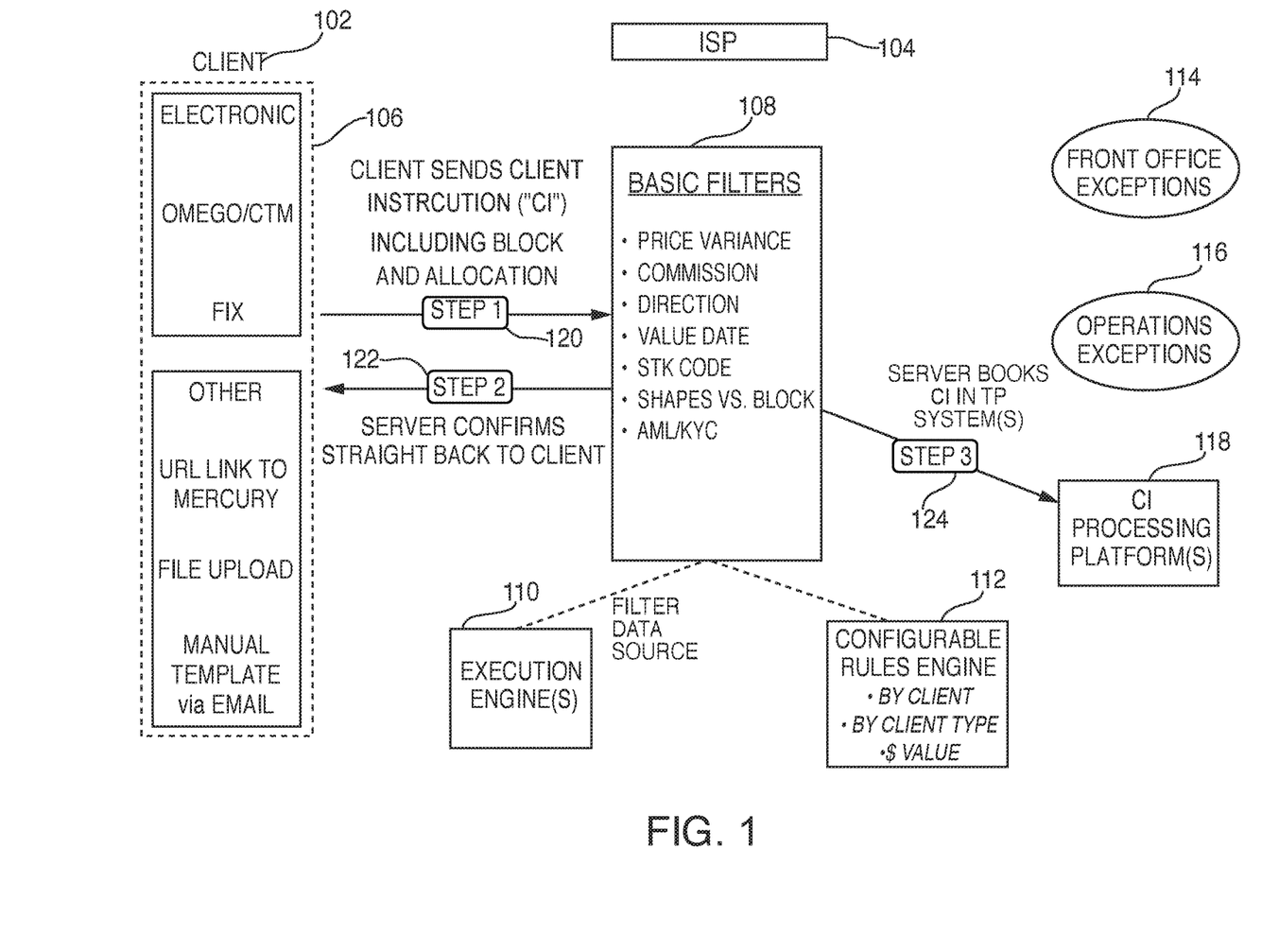
FIG. 1 shows a composite apparatus, and first method for using same overlaid thereon, for use with certain embodiments.

FIG. 1 shows a composite apparatus, and first method for using same overlaid thereon, for use with certain embodiments. FIG. 1 includes a client 102 portion of the apparatus. It should be noted that client 102 may communicate with a server using any electronic suitable communication including but not limited to an electronic matching engine such as Omgeo (a product manufactured by Omgeo LLC of Boston, Mass.), or a FIX protocol, as shown in 106. As also shown in 106, client 102 may receive communications using a URL link to a Mercury protocol communication, a file upload, a manual template via e-mail or any other suitable electronic communication.

Instant Services Portal ("ISP") 104, according to certain embodiments, is also shown in FIG. 1. ISP 104 may include filters 108 such as price variance filters, commission filters, direction filters, value date filters, stock code filters, shape trading versus block trading filters and/or Anti-Money Laundering ("AML")/Know Your Customer ("KYC") compliance filters. Execution engine 110 may preferably provide a filter data source for filters 108.

When client 102 sends instructions 120 such as a block trade instruction, and information for apportioning and/or allocating such a block trade among related entities to ISP 104, such information may preferably be filtered to determine whether the block and allocations information satisfies one or more of the aforementioned filters. Such a determination may be sent to configurable rules engine 112 to determine whether the client meets required specifications for performing the received instructions, the client type meets required specifications for performing the received instructions and/or the value proposition associated with performance and/or completion of the instructions.

At some point following receipt of the instructions, ISP 104, which may include a server, may use the server to send a confirmation 122 directly back to client 102.

Following transmission of confirmation at 122, ISP may further transmit communications 124 regarding the received instruction to client instruction processing platform 118 to perform the received instruction. In such a circumstance, front office exceptions sub-entity 114 and operations exceptions sub-entity 116 may preferably not be involved.

Figure 2:
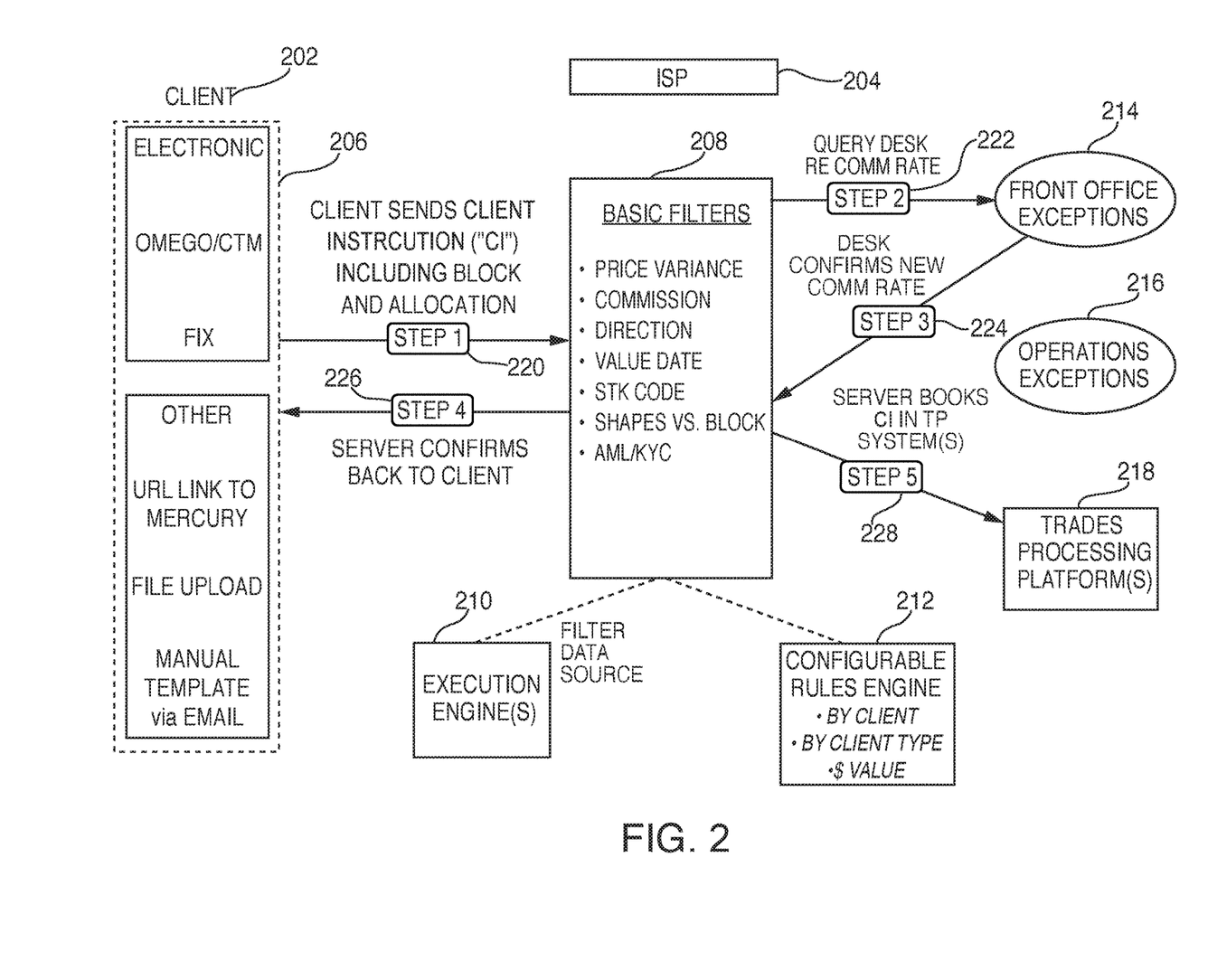
FIG. 2 shows the composite apparatus of FIG. 1, and a second method for using same overlaid thereon, for use with certain embodiments.

FIG. 2 shows the composite apparatus of FIG. 1, and a second method for using same overlaid thereon, for use with certain embodiments. While the architecture of the composite apparatus of FIG. 2 is the same as the composite apparatus of FIG. 1, nevertheless, the method set forth in FIG. 2 differs from the method set forth in FIG. 1.

While the method set forth in in FIG. 2 again begins with a client 202 transmitting, using electronic, Omgeo or FIX protocol 206, a block instruction and allocations to ISP 204, as shown at 220. Thereafter the method set forth in FIG. 1 and the method set forth in FIG. 2 differ.

ISP 204 in FIG. 2 preferably uses filters 208, which may use execution engine 210 as a filter data source and configurable rules engine 212. Prior to step 222, one or more of filters 208 determine that a commission ("comm") rate detected in the client instruction 220 differs from a rate previously associated with an interest underlying the client instructions. Such a query may preferably then be sent at 222 to front office exceptions at 214.

At step 224, front office exceptions 214 determines that such a comm rate is, although not currently associated with the interest, nevertheless acceptable and preferably immediately transmits this response to filters 208. Thereafter, one or more servers associated with filters 208 may nearly-immediately confirm completion of instructions to client at step 226. Following preferably near-immediate confirmation of completion of instructions at step 226, one or more servers associated with filters 208 may then complete the instructions by booking and/or allocating instructions from client at 228; preferably through the use of client instruction processing platform 218. It should be noted that in such a circumstance, operations exceptions sub-entity 216 may preferably not be involved.

Figure 3:
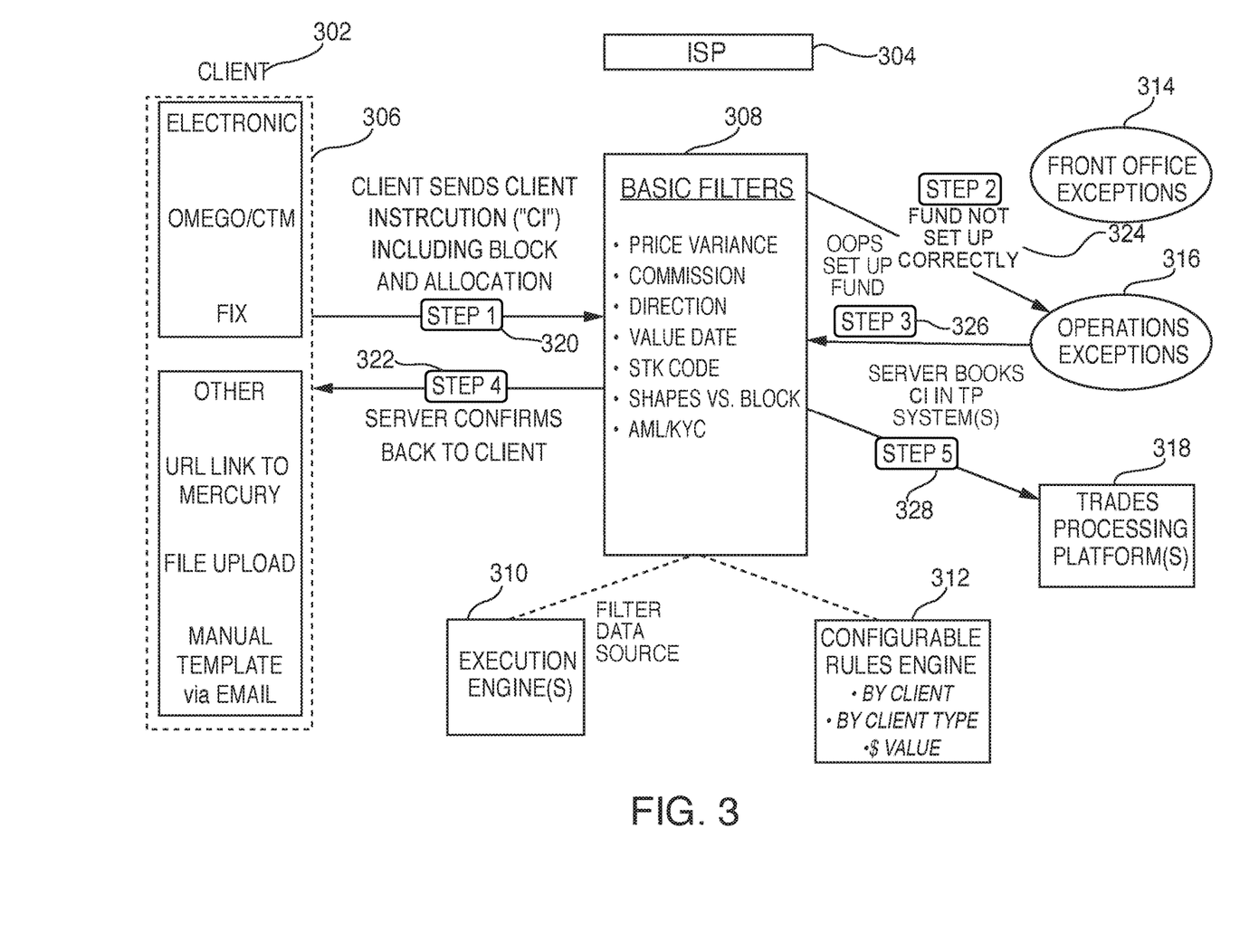
FIG. 3 shows the composite apparatus of FIG. 1, and a third method for using same overlaid thereon, for use with certain embodiments.

FIG. 3 shows the composite apparatus of FIG. 1, and a third method for using same overlaid thereon, for use with certain embodiments.

FIG. 3 shows the composite apparatus of FIG. 1, and a second method for using same overlaid thereon, for use with certain embodiments. While the architecture of the composite apparatus of FIG. 3 is the same as the composite apparatus of FIG. 1, nevertheless, the method set forth in FIG. 3 differs from the method set forth in FIG. 1.

While the method set forth in FIG. 3 again begins with a client 302 transmitting, using electronic, Omgeo or FIX protocol 306, a block instruction and allocations to ISP 304, as shown at 320, thereafter the method set forth in FIG. 1 and the method set forth in FIG. 3 differ.

ISP 304 in FIG. 3 preferably uses basic filters 308, which may use execution engine 310 as a filter data source and configurable rules engine 312. Prior to step 322, one or more of filters 308 determines that client entity, such as a client's fund, detected in the client instruction 320 may not satisfy one or more requirements as set forth in filters 308. Such a query may preferably then be sent at 324 to operations ("ops") exceptions at 318.

At step 326, ops exceptions 314 determines that such a fund's set up may preferably be corrected and, although not currently associated with the interest, nevertheless the fund is acceptable and preferably immediately transmits this response to filters 308. Thereafter, one or more servers associated with filters 308 may nearly-immediately confirm completion of instructions to client at step 322. Following preferably near-immediate confirmation of completion of instructions at step 322, one or more servers associated with filters 308 may then complete the instructions by booking and/or allocating instructions from client at 328; preferably through the use of client instruction processing platform 318. It should be noted that in such a circumstance, front office exceptions sub-entity 316 may preferably not be involved.

Thus, systems and methods for preferably rule-based, preferably tunable, client-server communications filtering have been provided. Persons skilled in the art will appreciate that the present invention can be practiced by other than the described embodiments, which are presented for purposes of illustration rather than of limitation. The present invention is limited only by the claims that follow.

What is claimed is:

1. A tunable client-server communications filter, the filter comprising:
    a receiver configured to receive a client instruction, said instruction comprising a client identification, a client type and a total value;
    a server comprising a plurality of filters, the plurality of filters comprising at least two of a price variance filter, a commission filter, a direction filter, a value date filter, an interest code filter, a block client instruction code filter and an anti-money laundering code filter,
    wherein, upon the receiver receiving the client instruction, the server is configured to:
    filter the client instruction, the filtering comprising determining whether a client associated with the client instruction is an acceptable client and a client type associated with the client instruction is an acceptable client type, then, upon determination that the client is an acceptable client and the client type is an acceptable client type, determining whether the total value is within a predetermined tolerance of an acceptable total value; and
    based on the filtering, prior to completion of performance of the instruction, immediately confirm completion of performance of the instruction; and
    a client instruction processing platform, wherein, following the server immediately confirming completion of performance of the instruction, the server transmits a message to the client instruction processing platform to complete performance of the instruction;
    wherein at least one of the plurality of filters is tunable such that the at least one filter may be tuned to increase or decrease the number of client instructions for which completion may be confirmed prior to performance of the instruction based at least in part on adjusting the tolerance.

2. An apparatus for tunable client-server communications filtering, the apparatus comprising:
    a server comprising a plurality of filters, said server that is configured to receive a client instruction, said instruction comprising a client identification, a client type and a total value, wherein, upon the server receiving the client instruction, said plurality of filters that filters the client instruction to determine whether the client instruction is associated with an acceptable client, an acceptable client type, and to determine whether said instruction is within a predetermined tolerance of an acceptable instruction, then, upon determination that the client is an acceptable client, the client type is an acceptable client type and the total value is within a predetermined tolerance of an acceptable total value, and prior to completion of performance of the instruction, the server immediately confirms completion of performance of the instruction; and
    a client instruction processing platform, wherein, following the server immediately confirming completion of performance of the instruction, the server transmits a message to the client instruction processing platform to complete performance of the instruction;
    wherein the plurality of filters comprises at least two of a price variance filter, a commission filter, a direction filter, a value date filter, an interest code filter, a block client instruction code filter and an anti-money laundering code filter; and
    wherein at least one of the plurality of filters is tunable such that the at least one filter may be tuned to enable confirmation of completion prior to completion of performance of the instruction for a greater or lesser number of client instructions based at least in part on adjusting a filtering characteristic.

3. The apparatus of claim 2, the plurality of filters comprising at least one of a price variance filter, a commission filter, a direction filter, a value date filter, an interest code filter, a block client instruction code filter and an anti-money laundering code filter.

4. The apparatus of claim 2, further comprising an exception engine for determining whether at least one of the plurality of filters may be overridden.

5. The apparatus of claim 2, further comprising an operations exception engine, said operations exception engine electronically coupled to said server, said operations exception engine for determining whether the client is an acceptable client.

6. The apparatus of claim 5, wherein the operations exception engine is configured to determine whether a type associated with client corresponds to the instruction.

7. The apparatus of claim 2, further comprising an execution engine, wherein the execution engine is operationally coupled to said plurality server filters to provide filter data thereto.

8. The apparatus of claim 2, wherein the client instruction further comprises block and allocation information, and wherein the server is configured to immediately confirm completion of performance of the instruction according to the block and allocation information.

9. The apparatus of claim 2, wherein the apparatus further comprises a configurable rules engine for setting client, client type and value tolerance rules.

10. A method for distributing processing power by deferring execution of a client of a client instruction, the deferral based at least in part on whether a client instruction satisfies predetermined tolerances, the method comprising:
receiving, using a server, a client instruction, said instruction comprising a client identification, a client type and a total value;
filtering, using a plurality of filters resident in the server, the client instruction to accept only a client instruction that is associated with an acceptable client, an acceptable client type, and the total value associated with the instruction is within a predetermined tolerance of an acceptable total value, based on the client and the client type, wherein the plurality of filters comprises at least two of a price variance filter, a commission filter, a direction filter, a value date filter, an interest code filter, a block client instruction code filter and an anti-money laundering code filter;
upon determination that the client is an acceptable client, the client type is an acceptable client type, and the total value is within a predetermined tolerance of an acceptable total value, prior to completion of performance of the instruction, confirming completion of performance of the instruction; and
following the server confirming completion of performance of the instruction, transmitting a message from the server to a client instruction processing platform to complete performance of the instruction.

11. The method of claim 10, further comprising an exception engine for determining whether at least one of the plurality of filters may be overridden.

12. The method of claim 10, further comprising using an operations exception engine for determining whether the client is within a client tolerance limit, said client tolerance limit based at least in part on the instruction.

13. The method of claim 12, further comprising determining, using the operations exception engine, whether the client type is within a client type tolerance limit, said client type tolerance limit being based at least in part on the instruction.

14. The method of claim 10, further comprising operationally coupling an execution engine to said server filters to provide filter data thereto.

15. The method of claim 10, further comprising tuning at least one of the plurality of filters to select more or less client instructions, said tuning being based, at least in part, on a filtering characteristic associated with the at least one of the plurality of filters.

16. The method of claim 10, further comprising receiving, using the server, block and allocation information, and immediately confirming completion of performance of the instruction according to the block and allocation information, said immediately confirming completion of the instruction according to the block and allocation information occurring prior to the completion of the instruction according to the block and allocation information.

17. The method of claim 10, further comprising adjusting tolerance rules associated with a client field, a client type field and a value.

* * * * *